April 13, 1926.

H. W. TERWILLIGER

DIRIGIBLE HEADLIGHT

Filed Sept. 3, 1924

1,580,545

Inventor
H. W. Terwilliger
By C. A. Snowles
Attorney

Patented Apr. 13, 1926.

1,580,545

UNITED STATES PATENT OFFICE.

HARRY WILSON TERWILLIGER, OF ALTOONA, PENNSYLVANIA.

DIRIGIBLE HEADLIGHT.

Application filed September 3, 1924. Serial No. 735,642.

*To all whom it may concern:*

Be it known that I, HARRY W. TERWILLIGER, a citizen of the United States, residing at Altoona, in the county of Blair and State of Pennsylvania, have invented a new and useful Dirigible Headlight, of which the following is a specification.

This invention relates to motor vehicle headlights and more particularly to headlights of the dirigible type.

The primary object of the invention is to provide headlights of this character which may be readily and easily installed, eliminating the necessity of making extensive alterations in the usual vehicle construction to mount the same, and one which will be exceptionally efficient in operation.

Another important object of the invention is to provide means whereby the headlight may be disconnected from the controlling rod of the vehicle at the will of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
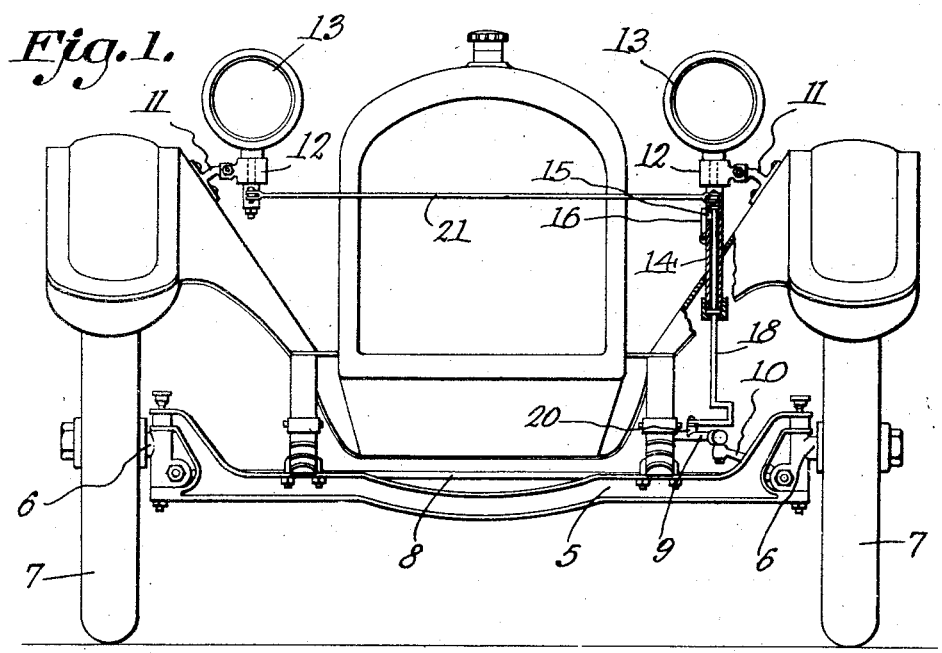
Figure 1 is a front elevational view disclosing a dirigible headlight constructed in accordance with the invention.
Figure 2:
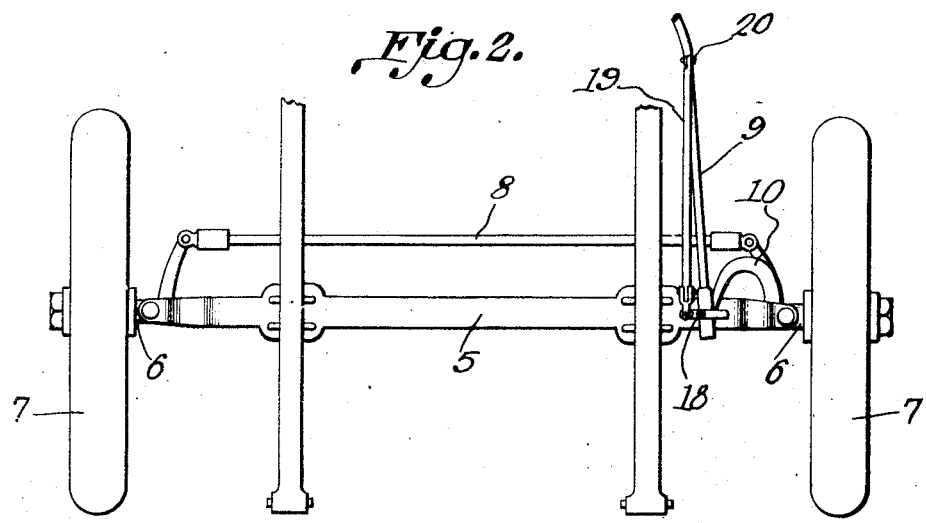
Figure 2 is a plan view thereof.

Referring to the drawing in detail, the reference character 5 indicates the front axle of a motor vehicle on which the stub axles 6 are mounted, which stub axles accommodate the wheels 7. The axles 6 are connected by the usual tie rod 8, the push rod 9 forming a part of the usual steering wheel being supported in the usual way and connected with the arm 10 to transmit movement of the steering mechanism to the front wheels.

Bracket members indicated at 11 are secured to the mud guards of the motor vehicle, the lamp bracket being formed with bearings 12 to accommodate the lamp supports on which the lamps 13 are mounted. The lamp support at one side of the vehicle frame embodies a tubular supporting post 14 that extends upwardly and has connection with the lamp, the tubular supporting post being formed with a lateral opening to accommodate the finger 15 forming a part of the swinging arm 16 which is mounted at one side of the tubular post 14 and held in its active or inactive position by means of the spring member 17 which is shown as seated in a suitable recess formed in the wall of the hollow post 14.

The controlling rod is indicated at 18 and extends upwardly through the tubular supporting post 14 as clearly shown by Figure 1 of the drawings, the rod 18 being provided with a suitable opening adapted to register with the lateral opening of the tubular supporting post 14 so that the finger 15 may pass thereinto and connect the members 14 and 18 so that movement of the controlling rod 18 will operate to move the lamps in horizontal planes to illuminate the path of travel of the machine.

As shown, the lower end of the controlling rod 18 is offset and has connection with the operating rod 19 which in turn has connection with the push rod 9 at 20.

In order that the lamps will operate simultaneously a tire rod 20 is provided, which has connection with the tubular lamp post.

Figures 3, 4:
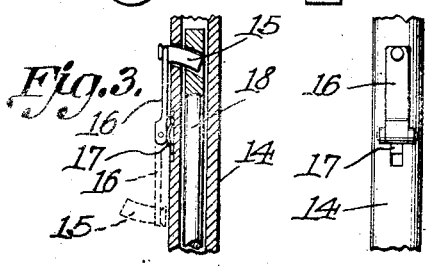
Figure 3 is a sectional view through one of the hollow supporting posts of a lamp and illustrating the means for connecting the operating rod to the hollow post.
Figure 4 is an elevational view thereof.

From the foregoing it will be obvious that when it is desired to throw the headlights 13 out of operation, as for daylight running, the arm 16 may be swung downwardly to a position as shown in dotted lines by Figure 3 of the drawing, thereby disconnecting the controlling rod 18 and lamp supporting post in which the same is positioned, allowing the controlling rod to move independently of the lamp supporting post.

Should it be desired to connect the controlling rod with the hollow lamp supporting post, it will be only necessary to throw the swinging arm 16 upwardly whereupon the finger 15 will pass into the registering opening of the controlling rod and lamp supporting post to connect them.

I claim:—

In a dirigible headlight a bearing member, a tubular lamp supporting member mounted within the bearing member, a controlling rod having an opening formed therein, and extending into the tubular member, means for securing the rod and tubular member against longitudinal movement with respect to each other, said tubular member having an opening disposed adjacent to the opening in the controlling rod, a spring member embedded in the tubular member, an arm carrying a finger at one end, and pivotally supported above the spring member, said spring member adapted to engage opposite sides of the arm to hold the arm in its active or inactive position, and the finger carried by the arm adapted to pass through the opening to connect the rod and tubular member.

In testimony that I claim the foregoing as my own, I have hereto affixed my signature.

HARRY WILSON TERWILLIGER.